UNITED STATES PATENT OFFICE.

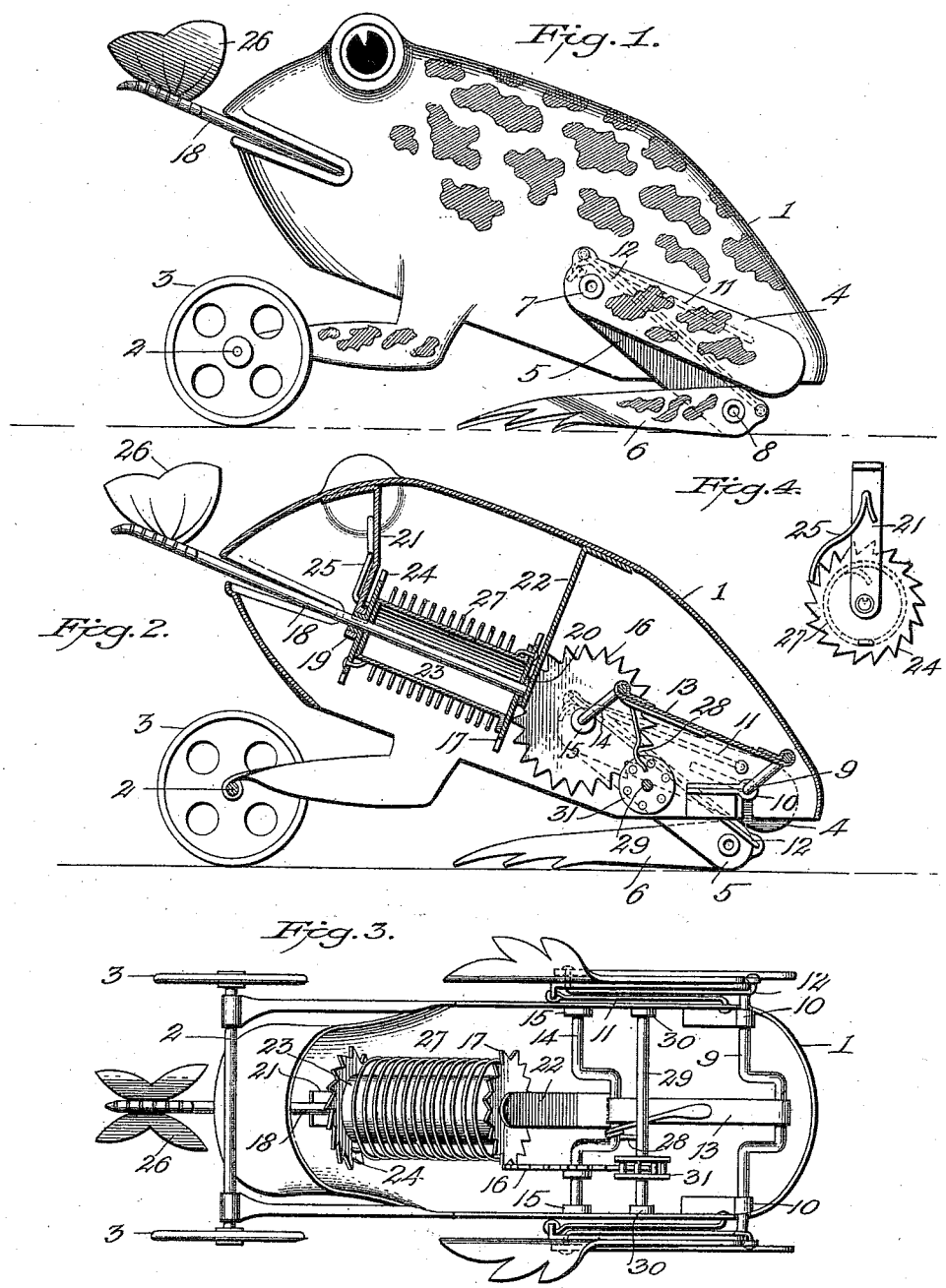

CHARLES A. LEWIS, OF DENVER, COLORADO.

MECHANICAL TOY.

985,746.  Specification of Letters Patent.  Patented Feb. 28, 1911.

Application filed March 1, 1910.  Serial No. 546,584.

*To all whom it may concern:*

Be it known that I, CHARLES A. LEWIS, a citizen of the United States of America, residing in the city and county of Denver and State of Colorado, have invented a new and useful Mechanical Toy, of which the following is a specification.

My invention relates to improvements in mechanical toys, and the objects of my invention are: First: to provide a jumping frog or other jumping animal toy. Second: to provide a jumping frog or other animal toy that will automatically make a number of jumps in succession; and third: to provide a combined rolling jumping frog form of toy. I attain these objects by the mechanism illustrated in the accompanying drawings, in which:

Figure 1 is a side elevation of a jumping frog embodying my invention. Fig. 2, is a vertical, longitudinal, sectional view thereof. Fig. 3, is a bottom plan view of the same; and Fig. 4, is an end view of the ratchet wheel, pawl, and bracket.

Similar letters of reference refer to similar parts throughout the several views.

Referring to the drawings, the numeral 1 designates the body of my jumping frog. This body comprises a semi-circular piece of any suitable material, such as brass or tin, which is formed and shaped to represent the back and sides of the body of the frog or other animal, and the back and sides are also formed into a rough surface representative of a frog's natural skin or of the skin of any other animal it is desired to represent in a jumping toy. This body portion is provided with legs and feet characteristic of the frog or other animal the toy represents.

The front feet are arranged to support in suitable shaft bearing portions a shaft 2, which extends across from one front foot to the other and far enough beyond each to receive a wheel 3 on each end. The shaft is preferably rotatably mounted in the feet and the wheels are secured in any suitable manner to the ends of the shaft. Each hind leg of the frog comprises an upper member 4, a middle member 5, and a lower member 6, the members 4 and 5 being connected by a suitable pivot 7, while the members 5 and 6 are likewise connected by a pivot 8. The members 4 are suitably secured adjacent to their rear ends, to a crank shaft 9, which is mounted in bearings 10, secured to opposite sides of the frog. Rods 11 are pivotally connected at their rear ends to the sides of the frog, slightly above the pivotal points of the crank shaft 9, and these rods, at their opposite ends, are connected to the upper ends of the middle leg members 5, slightly beyond the pivots 7, the legs being in the position shown in Figs. 1 and 2. Rods 12, are connected at one end to the upper ends of the members 4, slightly above or beyond their pivotal connection with the members 5, and at their opposite ends these rods are connected to the rear end of the members 6, back of the pivots 8. As the members 4 of the legs are partially rotated by the crank shaft 9, as will be presently described, their free ends travel in a slightly greater arc than that described by the forward ends of the rods 11, and these rods therefore draw upon the upper ends of the leg members 5, which turn on their pivots 7, so that their lower ends move away from the ends of the members 4, connected to the crank shaft, and as the said members 5 move relatively to the members 4, the rods 12, which are pivotally connected to the members 4, beyond or eccentric to the pivots 7, draw upon the ends of the members 6, and turn them upon their pivots 8, so that their outer ends, which are formed to represent feet, move away from the members 5, the movements of the members one upon the other causing the legs to assume extended positions, which impart the hopping movement to the frog.

The crank portion of the shaft 9 is positioned in the central portion of the body of the frog, and one end of a connecting rod 13 is pivotally connected to this crank portion of the shaft, and its opposite end is pivotally connected to the crank portion of a crank shaft 14, that is journaled in suitable bearings 15 upon the sides of the frog. Upon one end of the crank shaft 14 a thin disk gear 16 is secured, which meshes with a gear wheel 17, positioned at right angles to it and loosely mounted on a winding shaft 18, that extends longitudinally through the mouth of the frog, and is rotatably journaled in bearings 19 and 20, formed on the ends of arms or brackets 21 and 22, that are secured to the inner wall of the back portion of the frog.

A drum 23 is secured at one end to the gear wheel 17, and at its opposite end is loosely mounted on the shaft 18, and adjoining this end of the drum a ratchet wheel 24 is mounted on and is rigidly secured to the shaft in any suitable manner. The teeth of this ratchet wheel are engaged by a spring pawl 25, which is secured to the adjacent bracket 21. The shaft 18 extends through and beyond the bracket 21, and a butterfly thumb nut 26 is secured to its outer end. A coiled spring 27 is loosely wound on the drum, one end of which is secured to the ratchet wheel, and its opposite end is secured to the drum or to the gear 17. To the crank portion of the crank shaft 14 a spring arm 28 is attached, one end of which is connected to the connecting rod 13. The opposite end of this spring extends down in position to engage a shaft 29 at each revolution of the crank shaft 14. This shaft 29 extends across the body of the frog from side to side and is rotatably journaled in bearings 30 formed thereon. A gear pinion 31 is secured on the shaft in position to mesh with the gear 16 and modify the speed of the same.

The operation is as follows: The spring 27 on the drum is wound by turning the butterfly nut which rotates the shaft and its ratchet wheel, the spring pawl 25 holding the ratchet wheel and shaft and butterfly nut as they are turned to wind up the spring on the drum, which is held from turning by either holding the frog so that its legs cannot act, or by pressing the thumb against either of the gear wheels 16 or 17. After the spring has been wound up the frog is placed on a floor or table and the tension of the spring causes the rotation of the drum 27 and gear wheel 17, which latter operates the gear wheel 16 and its crank shaft 14. As the crank shaft 14 revolves the rod 13 connecting it with the crank shaft 9 causes a partial rotation of the latter shaft, which results in the extension of the hind legs through the medium of the rods 11 and 12, as previously described. The extension of the legs being accomplished quickly and with force, the rear end of the frog is thereby lifted successively in a manner resembling a hopping motion, and the frog is propelled forward upon the wheels 3. At each revolution of the crank shaft 14 the mechanism is momentarily checked by the engagement of the spring arm 28 with the shaft 29, and this occurs after the legs have been extended and have returned to partially contracted positions, the rear end of the frog being elevated. But as the frog drops and lights upon the partially contracted legs the spring arm is thereby caused to escape the shaft 29 and the mechanism is again released. The momentary stopping of the mechanism causes the successive hopping motions, as will be apparent. As the crank shaft 14 revolves the shaft 9 is moved in unison therewith until both cranks are on a dead center line, when the shaft 9 ceases to rotate and the further movement of the shaft 14 reverses the movement of the shaft 9. Thus the crank of the shaft 9 is pulled a half revolution by the shaft 14, during which period the legs are extended and this is followed by a reverse movement or pushing of the crank of the shaft 9, which effects the contracting of the legs.

The under side of the body of the frog may be covered by a belly plate, if desired, which may be attached to the body by any suitable means.

My invention is adapted to be applied to toys representing rabbits, kangaroos and other jumping animals.

Having described my invention, what I claim as new and desire to secure by Letters Patent is:

1. In a jumping toy, the combination of the body and legs portion representative of a jumping animal, said legs being jointed and provided with suitable connecting wires, with the mechanism comprising the winding stem, the spring controlled ratchet secured to said stem, the drum rotatively mounted on said stem and provided with a gear wheel, the coiled actuating spring secured to said drum and to said ratchet wheel, and arranged to wind thereon by said ratchet and stem winding mechanism, the pair of crank shafts in said toy's body, the connecting rod arranged to connect said crank shafts together, a gear mounted on one crank shaft and arranged to mesh with the gear of said drum, a brake shaft journaled in said toy between said crank shafts, a pinion mounted on said brake shaft and arranged to mesh with the gear on said drum connected crank shaft, and a resiliently yielding brake spring secured to said drum connected crank shaft and arranged to be moved by said drum connected shaft at each of its revolutions to engage said brake shaft in a manner to cause a momentary drag movement of said drum connected crank shaft that causes a stop movement of the hind legs of the toy, which causes the mechanism to impart an intermittent jumping movement to the legs of and to the body of the toy.

2. In a mechanical toy as specified, the combination with a body, of crank shafts mounted therein and united by connecting rod, a gear wheel on one of said shafts and a spring actuated gear wheel in mesh therewith, upper hind leg members connected to the other crank shaft so as to rotate therewith, intermediate members pivotally connected to the outer ends of the upper members and lower members pivotally connected to the outer ends of the intermediate members, rods pivotally connected to the intermediate members and to the body, rods connecting the upper and lower members, and means for momentarily checking the crank shaft having the gear wheel at each revolution thereof.

3. In a mechanical toy as specified, the combination with a body of a crank shaft mounted therein, three joint legs rigidly connected at their upper ends to said crank shaft so as to turn therewith, the joints of said legs being pivotally connected, rods connecting the upper and lower joints, rods connecting the upper ends of the intermediate joints with the body, a second crank shaft, a rod connecting said crank shafts, a driven gear wheel on the second shaft, a driving gear in mesh with the first gear, a ratchet wheel, a pawl therefor, a winding shaft rigidly secured to the ratchet wheel and passing loosely through the driving gear, a drum secured at one end to the driving gear and loosely mounted at its opposite end upon the winding shaft, a coil spring surrounding the drum and connected at one end to the driving gear and at the other end to the ratchet wheel, a spring arm on the driven crank shaft, a shaft mounted in the body in the path of the spring arm and adapted to engage the latter at each rotation of the driven crank shaft to momentarily check its movement, an idle gear on the shaft with which the spring arm engages in mesh with the driven gear, forelegs on the said body and wheels mounted in the ends of said forelegs.

4. In a mechanical toy as specified, a body having forelegs and wheels supported thereby, connected crank shafts mounted in said body, three parts pivotally jointed hind legs rigidly secured at their upper ends to the rear crank shaft, rods connecting the lower and upper leg members, rods connecting the intermediate leg members with the body, whereby when the said rear crank shaft is turned the legs are extended, a gear wheel on the forward crank shaft, spring operated mechanism in engagement with the said gear wheel and means for momentarily checking the movement of the driven crank shaft at each revolution.

In testimony whereof I affix my signature in presence of two witnesses.

CHARLES A. LEWIS.

Witnesses:
G. SARGENT ELLIOTT,
ADELLA M. FOWLE.

Copies of this patent may be obtained for five cents each, by addressing the "Commissioner of Patents, Washington, D. C."